J. R. & H. C. Campbell,

9294X

Permutation Lock.

Patented Dec. 28, 1835.

AM. PHOTO-LITHO. CO. N.Y. (OSBORNE'S PROCESS.)

John Read Cambell & Henry Cyrus Cambell of
Charlestown, coty. of Middlesex, Commonwealth of Massachus Letters Patent The Schedule referred to in these Letters Patent and making
part of the same, containing a description in the words of the
said John R. Cambell and Henry Cyrus Cambell themselves of
their improvement in Door Locks and other fastenings

---

Figure 1:
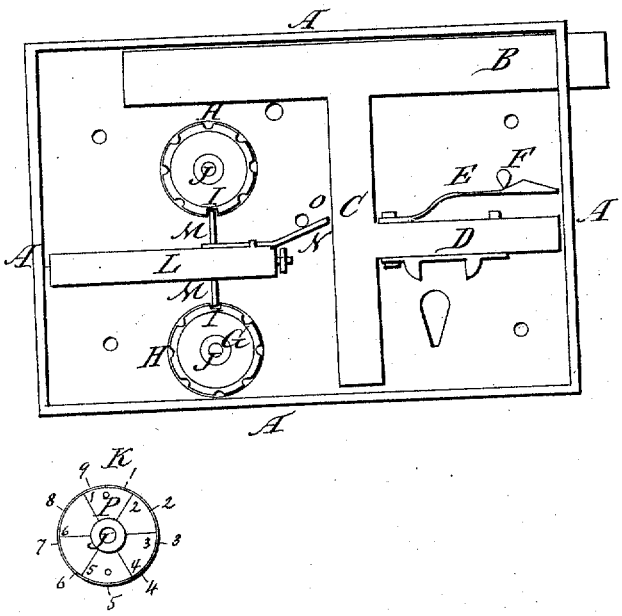
Figure 2:
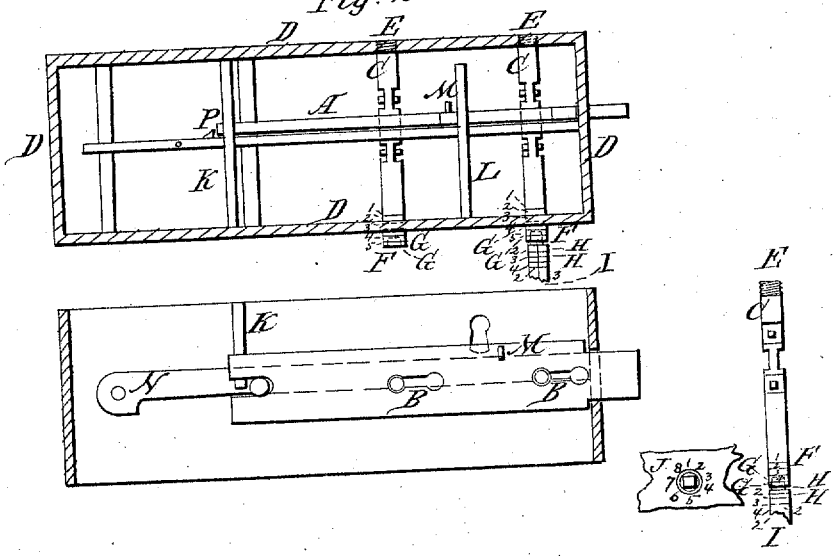

To all to whom these Presents shall come
Be it Known, that we, John Read Cambell & Henry Cyrus
Cambell both of Charlestown in the county of Middlesex and
commonwealth of Massachusetts, have invented a new and useful
improvement in the Lock for Doors or such like fastenings, and
the following is a full and exact description of the construction
and operation of the said Machine as invented or improved by
us —
The principle upon which we ground our improvement
is, that certain points of the arrangement are to be brought to
coincide before the bolt can be shot or withdrawn, which points
can be so deranged that without some clue to be guided by
it becomes almost hopeless to attempt their reconnection, and
this clue can be given by a combination of certain figures on
the outside - This known principle we improve the construction
of thus, Let Fig 1. A represent the enclosing case of the Lock
B the bolt or bolts - C. the cross bar running across the case, and
connecting the bolts - D. the catch bar to contain the catches
into which the key is to be applied - E. the spring behind said
catch bar, bearing against the point F.... G the wheels which con-
tain the numerous balks or obstacles H. intended to perplex &
also I the true points of use - J. is the axis of the outside wheels
fitting tightly into G. but capable of being displaced in order to
move round the outside or underwheels containing the numbers

9294X.

when it may be desired for precaution to change the combination
K. the circle of numbers on the outside case, and around the index
wheels. Between the wheels G. is placed the pivot rod L. supported
so as to revolve on its axle, and at one end is placed the cross catch
M, so adjusted as to pass through the open rings at the true point
I by the revolution of the pivot rod L. whenever said points are
brought opposite to each other. -

This revolution is effected by means of the short rod N
continued from the pivot rod L. sufficiently far towards the cross
bar C. to touch it so that when it is applied against the side
thereof, it acts as a stopper to the bolts being withdrawn when
locked - It is operated on or elevated so that the cross bar C
may be shoved under it, to unlock by means of a small hook
or key through the hole O and to lock it again or rather secure
it after it is locked, the same hook is applied to draw it down
against the side of the cross bar - Now by changing or turning round
the index wheels on the outside so as to derange the numbers, they
can scarcely be returned to their right places by any attempts,
unless the proper combination of numbers is known - The index
wheels P. on the outside have to each, a row of numbers around
the edge and also another on the outside of the case, is adapted
to them so that any two may be specified to be brought together
as the clue We also contemplate another mode of construction
which may be used separately or in conjunction with the one
above described, and we effect it thus. Let A. represent the [illegible]
in Fig. Two, having the holes B through it made by drilling
two holes near to each other and cutting a communication be-
tween them, narrower than the diameter thereof. C are two or m[illegible]
pins extending across the case D and passing through the holes B
at which part they are flattened, leaving shoulders and thus
enabled to permit the connecting slit between the holes B to
slide on this flat part which can of course only be done, when they are presented in that one position, two or more of these parts may be constructed on each pin and at different inclinations so as to operate as obstacles when it is desired to present them, tho each one when not desired to be in use, must have a pin through it to prevent its interfering. One end of each pin is furnished with a screw E to work in the case so as to draw it further in if required in making the change; the other end is made with a pipe F. or hollow squared for the reception of the Key intended to turn the pipe pin, and has two or more rings G. around its circumference numbered - The Key has like rings H. and there are also to be lines I. passing through these rings likewise numbered, and lastly around the case encircling the Pipe pin are rings J. of numbers also - K. is a brace intended to keep the bolt in its place - L is a pin for the reception of the Key to work in the catches M of the bolt, N. is a pin for the purpose of a pivot to the flat piece O placed parallel and adjoining the bolt - O is intended to rest on the round part of the pins C when they are not in their proper position but as soon as they are, it will fall into the flat part which is made purposely longer on one side to receive it; and at which time the bolt may be thrust back over a small stop P. which is fixed in O. to prevent it when the said pins are not rightly placed. It will be seen that by means of the numbers on the pipe, the Key and the case, the same changes and obstacles may be presented as in the first described mode

What we claim as our invention and not previously known or used and for which we now ask Letters Patent is, First, the balks or obstacles on the wheels intended to perplex in attempting to find the true points - Secondly. The Index plates or wheels as applied - Thirdly - The arrangement effected by the first rod, with its cross catch and its short rod continued to the cross bar running across the lock after the manner already shown - These are the parts of the first mode -

We also claim in the second mode the additional flattened parts of the pins intended to present balks or difficulties as

9394X provided for in the first mode, also the construction and appli-
cation of the flat piece placed parallel with and adjoining the
bolt as shown, and lastly the application of the rings and lines of
number on the pipe and key as well as on the face of the lock as
set forth In Testimony, that the above is a full description of
the manner of constructing our improvement as invented by us, we
have hereunto set our hands this Eighteenth day of November
in the year of our Lord One Thousand Eight Hundred and
Thirty five Witnesses                                                J. R. Cambell
Abrm. Moore                                             H. C. Cambell
W. A. Doak (Drawing)

E.W.J.C.                                                  [illegible] 1365 wds